United States Patent
Wang et al.

(10) Patent No.: US 12,149,475 B2
(45) Date of Patent: Nov. 19, 2024

(54) METHOD FOR CHANNEL STATE INFORMATION MEASUREMENT AND COMPUTATION FOR HIGH MOBILITY

(71) Applicant: MEDIATEK INC., Hsin-Chu (TW)

(72) Inventors: Chien-Yi Wang, Hsin-Chu (TW); Jiann-Ching Guey, Hsin-Chu (TW)

(73) Assignee: MEDIATEK Inc., Hsinchu (TW)

( * ) Notice: Subject to any disclaimer, the term of this patent is extended or adjusted under 35 U.S.C. 154(b) by 359 days.

(21) Appl. No.: 17/752,819

(22) Filed: May 24, 2022

(65) Prior Publication Data
US 2023/0006793 A1 Jan. 5, 2023

Related U.S. Application Data

(60) Provisional application No. 63/218,438, filed on Jul. 5, 2021.

(51) Int. Cl.
*H04L 5/00* (2006.01)

(52) U.S. Cl.
CPC .......... *H04L 5/0051* (2013.01); *H04L 5/0057* (2013.01)

(58) Field of Classification Search
CPC ... H04L 5/0051; H04L 5/0057; H04L 5/0091; H04L 5/0053; H04W 24/10; H04W 72/0446
See application file for complete search history.

(56) References Cited

U.S. PATENT DOCUMENTS

| | | | |
|---|---|---|---|
| 2021/0167911 A1* | 6/2021 | Xiao | H04W 72/0446 |
| 2023/0254022 A1* | 8/2023 | Hao | H04L 5/0091 370/329 |
| 2023/0344600 A1* | 10/2023 | Levitsky | H04L 5/0057 |

OTHER PUBLICATIONS

Taiwan IPO, office action for the Taiwanese patent application 111124034 (no English translation is available), dated Aug. 16, 2022 (4 pages).

* cited by examiner

*Primary Examiner* — Ashley Shivers
(74) *Attorney, Agent, or Firm* — Helen Mao; Imperium Patent Works (57) ABSTRACT

A method of downlink channel state information (DL CSI) computation and reporting is proposed to support high velocity in new radio (NR) systems. In a first novel aspect, two CSI reference slots are defined. CSI reference slot for CSI measurement is defined for determining which CSI-RS/SSB occasion(s) is used for computing CSI. CSI reference slot for CSI computation is defined for determining the slot where UE assumes the CSI computation should be based upon the channel at that time onwards. In a second novel aspect, UE can be configured with a CSI computation period consisting of one or N slots and can be divided into multiple sub-periods without overlap. UE can be configured to compute and report wideband CSI and subband CSI for the whole CSI computation period and/or for each sub-period.

20 Claims, 6 Drawing Sheets

METHOD FOR CHANNEL STATE INFORMATION MEASUREMENT AND COMPUTATION FOR HIGH MOBILITY

CROSS REFERENCE TO RELATED APPLICATIONS

This application claims priority under 35 U.S.C. § 119 from U.S. Provisional Application No. 63/218,438, entitled "Extension of CSI Framework to Support High Mobility," filed on Jul. 5, 2021, the subject matter of which is incorporated herein by reference.

TECHNICAL FIELD

The disclosed embodiments relate generally to mobile communication networks, and, more particularly, to methods for channel state information (CSI) computation to support high velocity.

BACKGROUND

Fifth generation new radio (5G NR) is an improved radio access technology (RAT) that provides higher data rate, higher reliability, lower latency and improved system capacity. In NR systems, the terrestrial radio access network includes a plurality of base stations (BS), referred as next generation Node-Bs (gNBs), communicating with a plurality of mobile stations, referred as user equipment (UE). A UE may communicate with a base station (BS) or a gNB via the downlink and uplink. The downlink (DL) refers to the communication from the base station to the UE. The uplink (UL) refers to the communication from the UE to the base station. The 5G NR standard is developed by 3GPP. Channel State Information reference signals (CSI-RS) are utilized by UEs to measure and feedback the characteristics of a radio channel so that the gNB can use correct modulation, code rate, beam forming, etc. for DL data transmission.

In real developments, it is observed that the throughput drops significantly in high or medium velocity scenarios. One main reason is that the reported CSI becomes outdated due to fast channel variation. The channel variation can be observed in Doppler domain. In the current NR, CSI is calculated based on the located slot of CSI reference resource, which is before the uplink slot for CSI reporting. The CSI calculated for a past slot may not be useful at a later time when gNB needs to perform scheduling, especially in high velocity scenarios. To increase throughput, gNB needs to know the CSI that is good for "future" channels. The future CSI cannot be learned by a "one-shot" measurement as any channel variation requires at least two measurements to detect.

A solution is sought to extend the CSI framework in NR to support high velocity.

SUMMARY

A method of downlink channel state information (DL CSI) computation and reporting is proposed to support high velocity in new radio (NR) systems. In a first novel aspect, two CSI reference slots are defined. CSI reference slot for CSI measurement is defined for determining which CSI-RS/SSB occasion(s) is used for computing CSI. CSI reference slot for CSI computation is defined for determining the slot where UE assumes the CSI computation should be based upon the channel from that slot onwards. In a second novel aspect, UE can be configured with a CSI computation period consisting of one or N slots and can be divided into multiple sub-periods without overlap. UE can be configured to compute and report wideband CSI and subband CSI for the whole CSI computation period and/or for each sub-period.

In one embodiment, a UE receives channel state information reference signals (CSI-RS) configuration information from a base station (BS). The UE determines a first CSI reference slot for measurement and a second CSI reference slot for computation from the CSI-RS configuration information. The second CSI reference slot occurs after the first CSI reference slot in time domain. The UE measures CSI reference signals (CSI-RS) of a downlink channel that is received before the first CSI reference slot for measurements. The UE computes CSI of the downlink channel based on the second CSI reference slot for computation. The UE estimates and predicts the CSI of the downlink channel at a time starting from the second CSI reference slot for computation.

In another embodiment, a UE receives channel state information reference signals (CSI-RS) configuration information from a base station (gNB). The CSI-RS configuration comprises CSI-RS resources and a CSI computation period having one or multiple non-overlapping sub-periods within the CSI computation period in time domain. The UE measures multiple occasions of CSI-RS of a downlink channel that is received over the configured CSI-RS resources. The UE estimates CSI of the downlink channel for the CSI computation period using timing correlation of the multiple occasions of CSI-RS. The UE reports the estimated CSI of the downlink channel to the gNB, and the estimated CSI is reported based on the configured CSI computation period.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
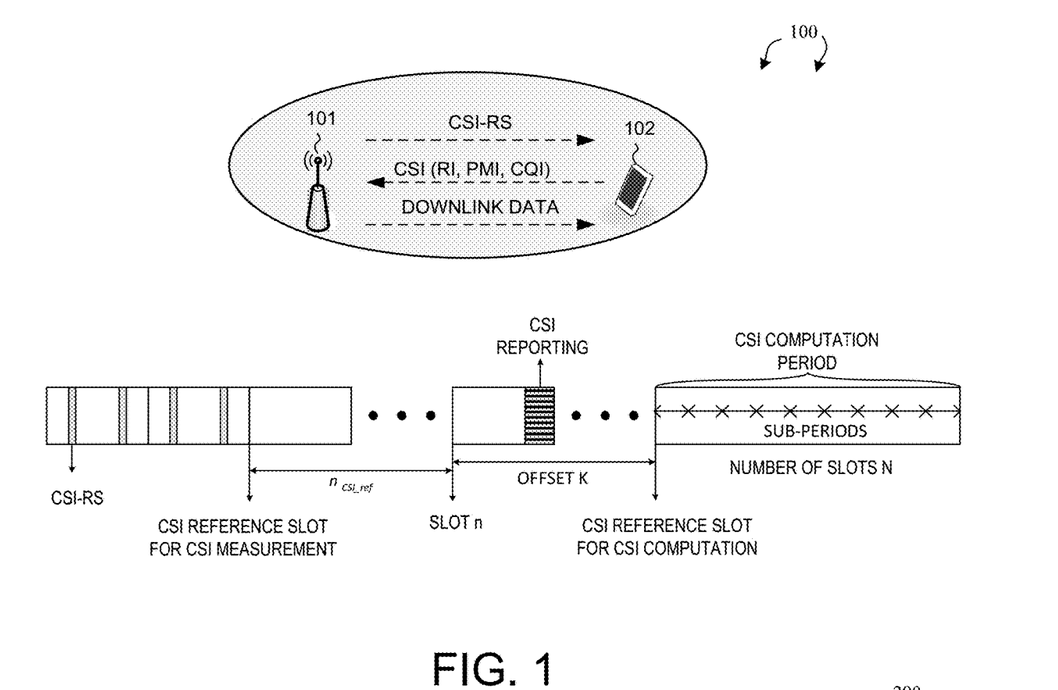
FIG. 1 illustrates a new radio (NR) mobile communication network with channel state information reference signal (CSI-RS) measurement, computation, and reporting for high velocity in accordance with one novel aspect.

FIG. 1 illustrates a new radio (NR) mobile communication network 100 with channel state information reference signal (CSI-RS) measurement, computation, and reporting for high velocity in accordance with one novel aspect. Mobile communication network 100 is an OFDM network comprising a serving base station (gNB 101) and a user equipment (UE 102). In 3GPP NR system based on OFDMA downlink, the radio resource is partitioned into slots in time domain, each slot is comprised of a number of OFDM symbols. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of twelve consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in NR, while the Physical Downlink Control Channel (PDCCH) is used to carry downlink control information (DCI). The control information may include scheduling decision, information related to reference signal information, rules forming the corresponding transport block (TB) to be carried by PDSCH, and power control command. For radio resource management (RRM) measurement in NR, each UE can be configured to measure synchronization signal (SS) blocks (SSB) and/or channel state information (CSI) reference signal (CSI-RS). For CSI-RS measurement, both frequency and timing resources need to be determined. CSI-RS are utilized by UEs to measure and feedback the characteristics of a DL channel so that gNB can use correct modulation, code rate, beam forming, etc. for DL data transmission.

In real developments, it is observed that the throughput drops significantly in high or medium velocity scenarios. One main reason is that the reported CSI becomes outdated due to fast channel variation. In accordance with one novel aspect, as depicted in FIG. 1, CSI acquisition and reporting are proposed to support high velocity scenarios. In one novel aspect, two CSI reference slots are defined. CSI reference slot for CSI measurement is defined for determining which CSI-RS/SSB occasion(s) is used for computing CSI. CSI reference slot for CSI computation is defined for determining the first time slot where UE assumes the CSI computation should be based upon the channel from that time slot onwards. For example, if CSI reporting occurs at slot(n), then the CSI reference slot for CSI measurement occurs at slot (n-$n_{CSI\_REF}$), and the CSI reference slot for computation occurs at slot(n+K). In another novel aspect, UE can be configured with a CSI computation period consisting of one or N slots and can be divided into multiple sub-periods without overlap. UE can be configured to compute and report wideband CSI and subband CSI for the whole CSI computation period and/or for each sub-period.

Figure 2:
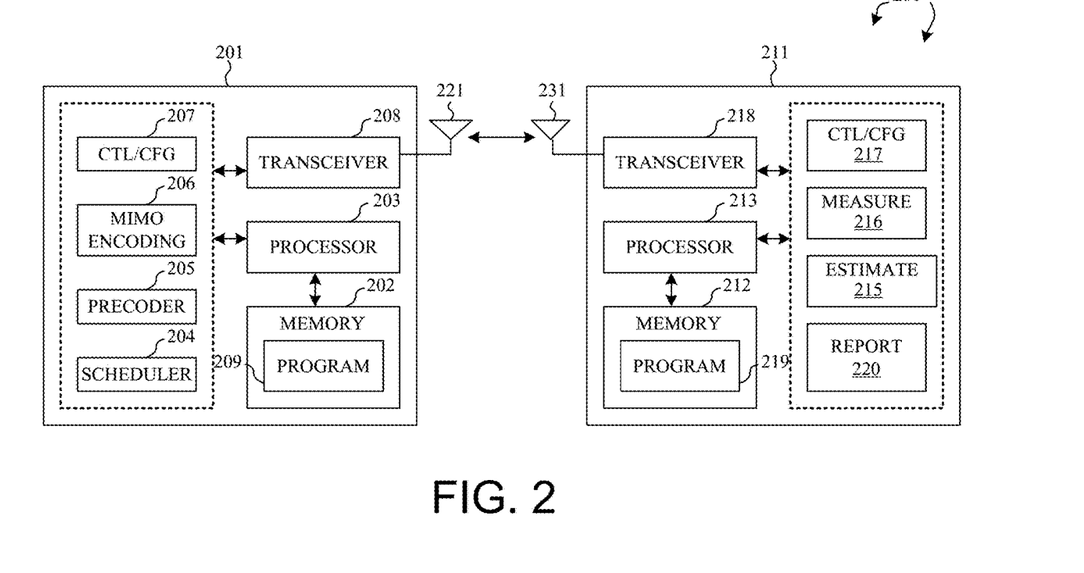
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules and circuits, when executed by the processors 203 and 213 (e.g., via executing program codes 209 and 219), for example, allow base station 201 to schedule (via scheduler 204), precode (via precoder 205), encode (via MIMO encoding circuit 206), and transmit control/config information and data (via control/config circuit 207) to UE 211, and allow UE 211 to receive the control/config information and data (via control/config circuit 217), measure CSI reference signal (via measurement circuit 216), estimate CSI (via estimation circuit 215), and report estimated CSI (via reporting circuit 220) accordingly.

Figure 3:
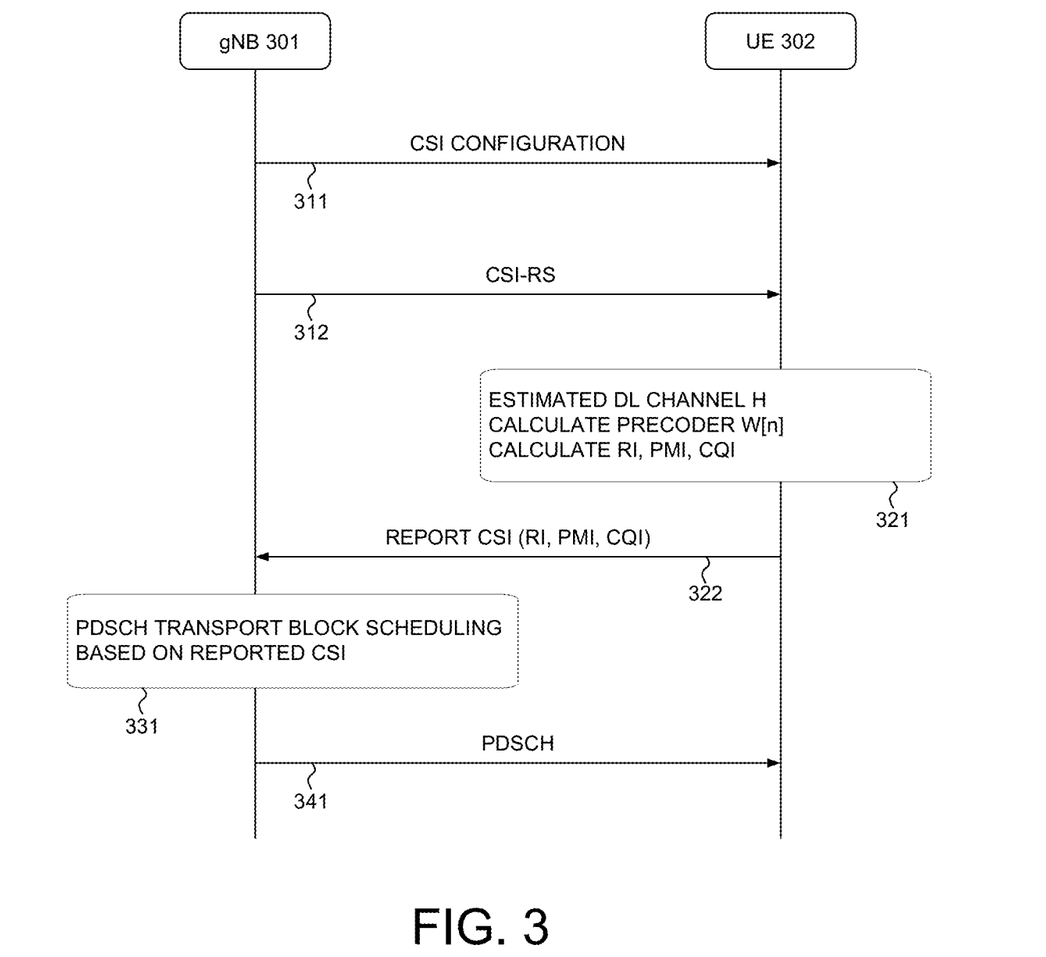
FIG. 3 illustrates a sequence flow of an overall procedure for CSI acquisition and reporting in accordance with one novel aspect.

FIG. 3 illustrates a sequence flow of an overall procedure for CSI acquisition and reporting in accordance with one novel aspect. In step 311, gNB 301 provides CSI configuration information to UE 302 for CSI acquisition and reporting. The CSI configuration information may comprise CSI reference signal configuration, CSI reference resource configuration, CSI reporting configuration, CSI reference slot for CSI measurement, CSI reference slot for CSI computation, and CSI computation period, etc. In step 312, gNB 301 transmits multiple occasions of CSI reference signals to UE 302 over the configured CSI-RS resources accordingly. In step 321, UE 302 receives the multiple occasions of CSI reference signals, estimates the effective downlink channel, and performs CSI computation based on the CSI configuration information.

In one novel aspect, two CSI reference slots are defined. CSI reference slot for CSI measurement is defined for determining which CSI-RS is used for computing CSI. CSI reference slot for CSI computation is defined for determining the first time slot where UE assumes the CSI computation should be based upon the channel from that time slot onwards. In another novel aspect, UE 302 can be configured by gNB 301 with a CSI computation period consisting of one or N slots and can be divided into multiple sub-periods without overlap. In step 322, UE 302 reports the computed CSI to gNB based on the CSI configuration information. The reported CSI parameters may include Rank Indicator (RI), Precoding Matrix Indicator (PMI), and Channel Quality Index (CQI). In step 331, gNB 301 receives the CSI feedback, and determines scheduling parameters for subsequent PDSCH transport block (TB) transmission. In step 341, gNB 301 transmits data to UE 302 over PDSCH using the determined parameters including modulation, code rate, beam forming.

Figure 4:
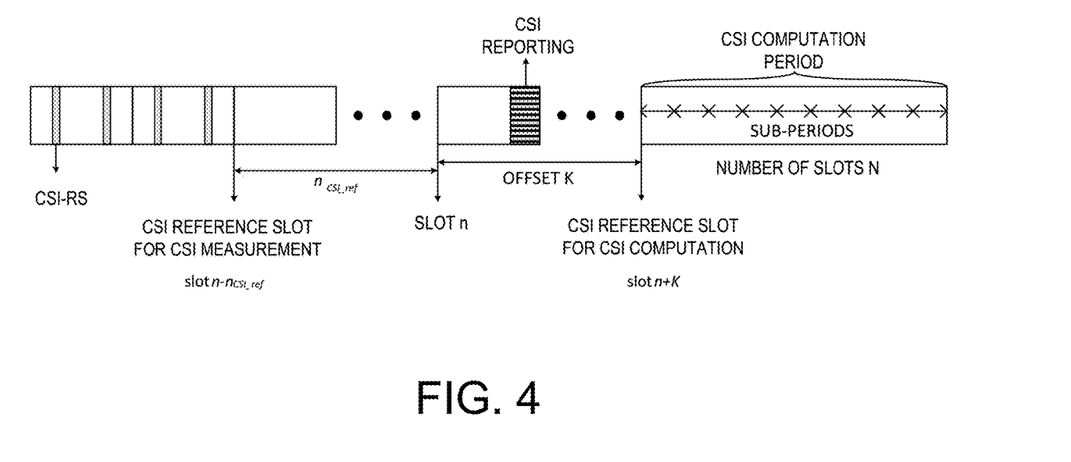
FIG. 4 illustrates a first embodiment of applying CSI reference slot for measurement and CSI reference slot for computation to support high velocity scenario in accordance with one novel aspect.

FIG. 4 illustrates a first embodiment of applying CSI reference slot for measurement and CSI reference slot for computation to support high velocity scenario in accordance with one novel aspect. CSI reference signals (CSI-RS) are dedicated measurement signals introduced to be used by UEs to acquire CSI, for example, for channel dependent scheduling, link adaptation, and transmission settings related to multi-antenna transmission. UE is configured to compute CSI based on one single occasion or multiple occasions of CSI-RS over configured CSI reference resource, e.g., a group of downlink frequency domain and time domain resource blocks. The CSI reference resource for a serving cell is defined as follows. In the frequency domain, the CSI reference resource is defined by the group of downlink physical resource blocks corresponding to the band to which the derived CQI value relates. In the time domain, the CSI reference resource is defined by a single downlink slot or special subframe to which the derived CQI value relates. In the spatial/layer domain, the CSI reference resource is defined by any RI and PMI on which the CQI is conditioned.

In the current NR, CSI is calculated based on the located slot of CSI reference resource, which is before the uplink slot for CSI reporting. However, the CSI calculated for a past slot may not be useful at a later time when gNB needs to perform scheduling, especially in high velocity scenarios. To increase throughput, gNB needs to know the CSI that is good for "future" channels when channel variation is high. The future CSI cannot be learned by a "one-shot" measurement as any channel variation requires at least two measurements to detect. In one novel aspect, a UE can be configured to measure multiple occasions of CSI-RS over multiple slots for a past DL channel, and the UE can also be configured to calculate and predict CSI of a future DL channel, based on channel variations detected from the multiple CSI-RS measurements.

Specifically, two CSI reference slots are defined to support high velocity scenarios. CSI reference slot for CSI measurement is defined for determining which CSI-RS is used for computing CSI. CSI reference slot for CSI computation is defined for determining the first slot where UE assumes the CSI computation should be based upon the channel at that time onwards. When UE is configured to compute CSI based on one single occasion of CSI-RS, the two CSI reference slots coincide and are the same as CSI reference resource of Rel-15 NR. When UE is configured to compute CSI based on multiple occasions of CSI-RS, for the purpose of determining which CSI-RS occasion(s) is used for computing CSI, the CSI reference slot for CSI measurement is the same as CSI reference resource of Rel-15 NR. When UE is configured to compute CSI based on multiple occasions of CSI-RS, the CSI reference slot for CSI computation can be configured the same as or after the uplink slot for CSI reporting. Multiple CSI-RS occasions can be multiple repetitions in a burst period or multiple CSI-RS resources in a CSI-RS resource set across slots no later than the CSI reference resource.

In the embodiment of FIG. 4, a UE is configured to compute CSI based on multiple occasions of CSI-RS, and to report CSI at SLOT n. The CSI reference slot for CSI measurement is the same as CSI reference resource that occurs before SLOT n with an offset value of $n_{CSI\_ref}$, e.g., occurs at SLOT $(n-n_{CSI\_ref})$. That is, the UE computes CSI based on multiple occasions of CSI-RS received and measured no later than SLOT $(n-n_{CSI\_ref})$. The CSI reference slot for CSI computation can be configured after the uplink slot for CSI reporting with an offset K, e.g., at SLOT (n+K). That is, the UE computed CSI is for a future time, starting from SLOT (n+K), where the UE assumes the CSI computation should be predicted on the channel starting from that future time of SLOT (n+K) onwards. Traditionally, the computed CSI over past CSI reference resource (e.g., SLOT $(n-n_{CSI\_ref})$) becomes outdated for future time (e.g., SLOT (n+K)) due to fast channel variation. By configuring two separate CSI reference slots for CSI measurement and for CSI computation, the UE can compute and predict future CSI in SLOT (n+K) based on multiple occasions of CSI-RS received and measured no later than SLOT $(n-n_{CSI\_ref})$. For example, CSI prediction can be performed using the autoregressive (AR) model $H[n]=\sum_{i=1}^{D} c_i H[n-i]$. The multiple CSI-RS measurements can be used to estimate the AR coefficients $\{c_i\}$. Then, this equation $H[n]=\sum_{i=1}^{D} c_i H[n-i]$ can be applied recursively to compute $H[n+K]$.

Figure 5:
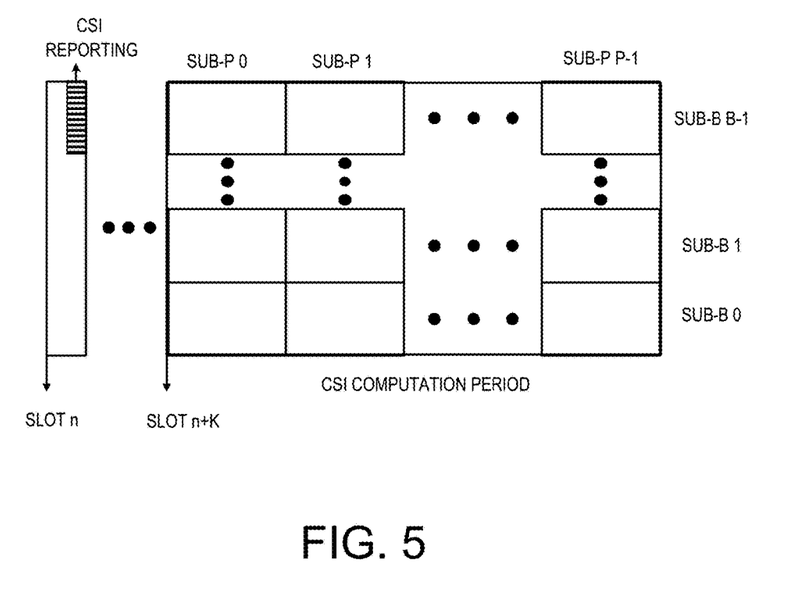
FIG. 5 illustrates a second embodiment of configuring CSI computation period with whole-period CSI and sub-period CSI to support high velocity scenario in accordance with one novel aspect.

FIG. 5 illustrates a second embodiment of configuring CSI computation period with whole-period CSI and sub-period CSI to support high velocity scenario in accordance with one novel aspect. UE can be configured with a CSI computation period consisting of one or multiple slots and can be divided into multiple sub-periods without overlap. Each sub-period consists of X consecutive slots, where X is configurable. A CSI computed for the whole CSI computation period is called "whole-period" CSI. A CSI computed for a sub-period is called "sub-period" CSI. A CSI computation period can start from the CSI reference slot for CSI computation. A CSI computation period can be set before the CSI resource reference specified in NR Release 15.

In the example of FIG. 5, in time domain, subperiods SUB-P 0, SUB-P 1, . . . , SUB-P P-1 are defined. In frequency domain, subbands SUB-B 0, SUB-B 1, . . . , SUB-B B-1 are defined. The size of sub-period depends on the total number of slots in the CSI computation period. If the number of slots in CSI computation period A is larger than the number of slots in CSI computation period B, then the size of sub-period for A is larger than or equal to the size of sub-period for B. When the number of slots in the CSI computation period is less than or equal to a certain predefined value, only the whole-period CSI is reported. Reporting of a whole-period CSI is omitted if none of slots in the CSI computation period comprise at least one higher layer configured downlink or flexible symbol. A valid sub-period is a sub-period in which all the slots comprise at least one higher layer configured downlink or flexible symbol. Reporting of a sub-period CSI is omitted if the sub-period is not a valid sub-period. Only the valid sub-periods are indexed, starting from the first valid sub-period. The gNB can inform UE which sub-period(s) can be omitted for CSI reporting. The omitted sub-periods are considered as invalid sub-periods.

In one preferred embodiment, the CSI reporting is configured to be in SLOT n, and the CSI computation period starts from the CSI reference slot for CSI computation, e.g., SLOT (n+K), as depicted in FIG. 5. Because the UE is configured to compute CSI based on multiple occasions of CSI-RS measured no later than SLOT $(n-n_{CSI\_ref})$, the UE can consider time domain correlation of the multiple occasions of CSI-RS to predict the CSI in SLOT (n+K). In addition, the UE is configured with a CSI computation period (e.g., across multiple slots) with a whole period and multiple non-overlapping subperiods, which can exploit time-domain correlation. The CSI computation period is designed to facilitate reduction of CSI feedback overhead. If N slots within the same sub-period can share the same CSI with little performance loss, then the overhead is reduced to 1/N. Besides, the channel variation in time is usually sparse in a transform domain, e.g., Doppler domain (through DFT). Then, M sub-periods may be described using M'<<M values, e.g., M'/M=¼.

In another alternative embodiment, the CSI reporting is configured to be in SLOT n, and the CSI computation period ends at the CSI reference slot for CSI measurement, which is the same as the CSI reference resource, e.g., SLOT (n-$n_{CSI\_ref}$) (not shown). The intention is for gNB to predict the future CSI, so UE should compute CSI only on the past observations. Under this scenario, the UE measures CSI-RS received no later than SLOT (n-$n_{CSI\_ref}$), and computes CSI using the computation period ending at the same slot. The UE still considers the time domain correlation of the entire computation period to estimate the CSI of the DL channel with reduction of CSI feedback overhead. However, the UE does not need to do any prediction for CSI of the DL channel starting from a future SLOT (n+K). The UE simply reports the computed past CSI to the network, and the network can predict a future CSI using the received past CSI.

Figure 6:
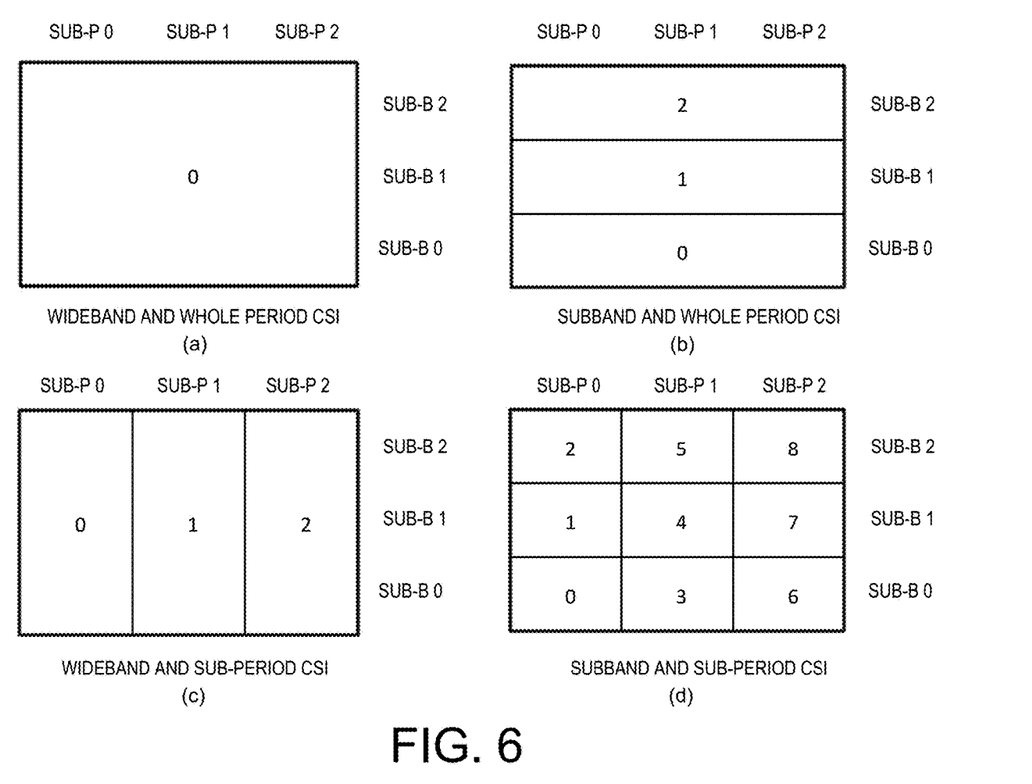
FIG. 6 illustrates examples of CSI computation period with whole-period CSI and sub-period CSI for wideband and subband.

FIG. 6 illustrates examples of CSI computation period with whole-period CSI and sub-period CSI for wideband and subband. The gNB can configure the UE to compute different combinations of CSI computing. As depicted in FIG. 6(a), UE can be configured to compute a wideband CSI for the whole CSI computation period. UE assumes that the computed CSI will be applied by gNB to the whole bandwidth in the whole CSI computation period. As depicted in FIG. 6(b), UE can be configured to compute subband CSI for the whole CSI computation period. For each subband CSI, UE assumes that the computed CSI will be applied by gNB to the referred subband in the whole CSI computation period. In this example, three subbands SUB-B 0, SUB-B 1, and SUB-B 2 are defined, and UE is configured to compute subband CSI for SUB-B 0, SUB-B 1, and SUB-B 2 in the entire CSI computation period.

As depicted in FIG. 6(c), UE can be configured to compute a wideband CSI for each sub-period. UE assumes that each computed CSI will be applied by gNB to the whole bandwidth in the referred sub-period. In this example, three subperiods SUB-P 0, SUB-P 1, and SUB-P 2 are defined, and UE is configured to compute CSI for the entire bandwidth in three sub-periods SUB-P 0, SUB-P 1, and SUB-P 2. As depicted in FIG. 6(d), UE can be configured to compute subband CSI for each sub-period. UE assumes that each computed CSI will be applied by gNB to the referred subband in the referred sub-period. In this example, three subbands SUB-B 0, SUB-B 1, and SUB-B 2 are defined, and three subperiods SUB-P 0, SUB-P 1, and SUB-P 2 are defined. UE is configured to compute subband CSI (0-8) for SUB-B 0, SUB-B 1, and SUB-B 2 in three sub-periods SUB-P 0, SUB-P 1, and SUB-P 2.

Figure 7:
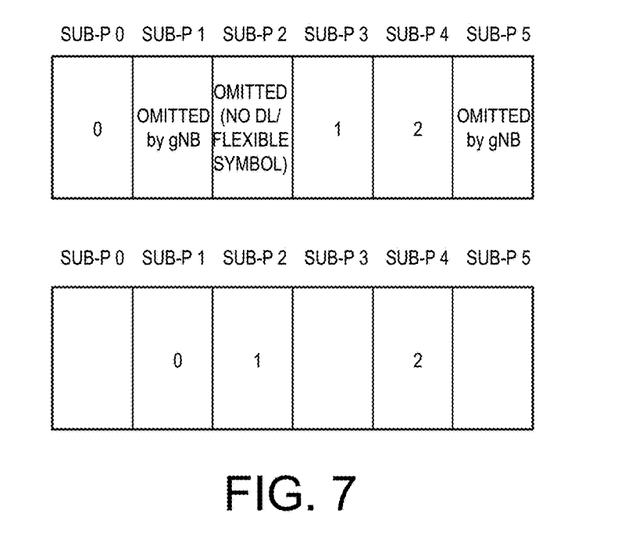
FIG. 7 illustrates examples of CSI computing and reporting to support high velocity scenario in accordance with one novel aspect.

FIG. 7 illustrates examples of CSI computing and reporting to support high velocity scenario in accordance with one novel aspect. In one embodiment, the gNB can inform UE which sub-period(s) can be omitted for CSI reporting. The omitted sub-periods are considered as invalid sub-periods. In the example of FIG. 7(a), sub-periods 1 and 5 are omitted as informed by the gNB, and sub-period 2 is omitted as none of slots comprises at lease one higher layer configured downlink or flexible symbol. As a result, the UE only needs to report subperiod CSI for SUB-P 0 (0), SUB-P 3 (1), and SUB-P 4 (2). In another embodiment, the gNB can configure the UE to report subperiod CQI only for the best K subperiods in the CSI computation period, where K is configurable. In the example of FIG. 7(b), each of subperiod CQI for sub-periods 1, 2, and 4 are better than the subperiod CQI for sub-periods 0, 3, and 5. If K=3, then the UE only reports subperiod CQI for SUB-P 1 (0), SUB-P 2 (1), and SUB-P 4 (2). In one embodiment, the number of reported sub-periods can be determined by UE. The reported CSI consists of two stages, where UE reports the chosen number of sub-periods in the first stage.

In one example, sub-period CQI is reported by the UE by signaling the quantized difference from the whole-period CQI. In another example, Sub-period RI is reported by the UE by signaling difference from the whole-period RI. In another example, sub-period PMI share the same basis vectors as the whole-period PMI. The coefficients of subperiod PMI are reported by signaling the quantized difference of amplitude and phase from the coefficients of the whole-period PMI.

In one example, for semi-persistent CSI reporting on PUSCH, the configuration of the CSI computation period can be updated by the activating DCI scrambled with SP-CSI-RNTI, e.g., the number of slots. In another example, for semi-persistent CSI reporting on PUCCH, the configuration of the CSI computation period can be updated by the activation command, e.g., the number of slots. In another example, for aperiodic CSI reporting, the configuration of the CSI computation period can be updated by the triggering DCI, e.g., the number of slots.

Figure 8:
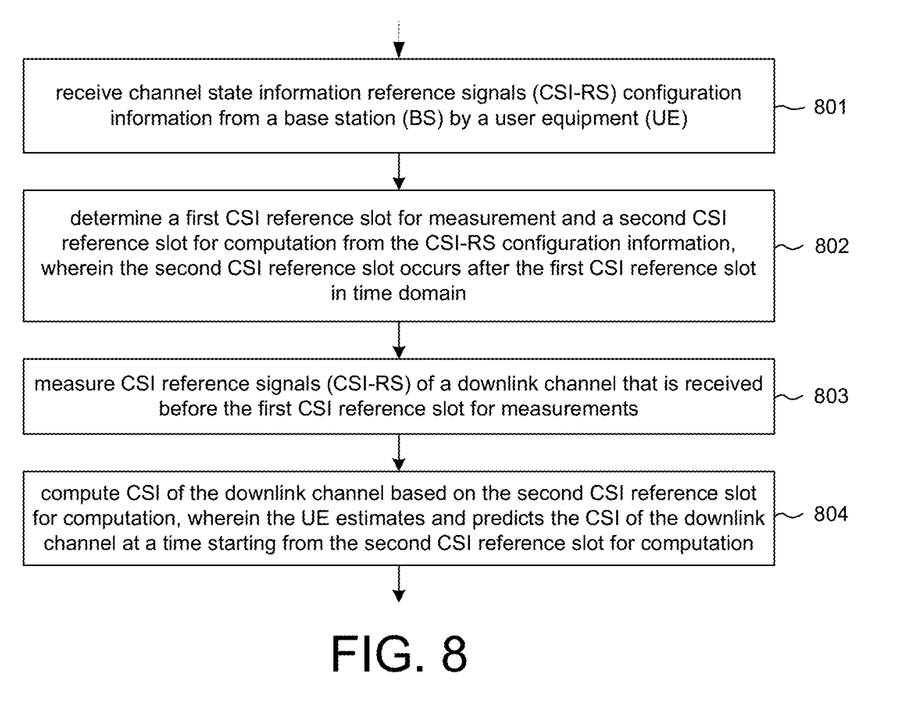
FIG. 8 is a flow chart of method of applying CSI reference slot for measurement and CSI reference slot for computation to support high velocity in accordance with one novel aspect.

FIG. 8 is a flow chart of method of applying CSI reference slot for measurement and CSI reference slot for computation to support high velocity in accordance with one novel aspect. In step 801, a UE receives channel state information reference signals (CSI-RS) configuration information from a base station (BS). In step 802, the UE determines a first CSI reference slot for measurement and a second CSI reference slot for computation from the CSI-RS configuration information. The second CSI reference slot occurs after the first CSI reference slot in time domain. In step 803, the UE measures CSI reference signals (CSI-RS) of a downlink channel that is received before the first CSI reference slot for measurements. In step 804, the UE computes CSI of the downlink channel based on the second CSI reference slot for computation. The UE estimates and predicts the CSI of the downlink channel at a time starting from the second CSI reference slot for computation.

Figure 9:
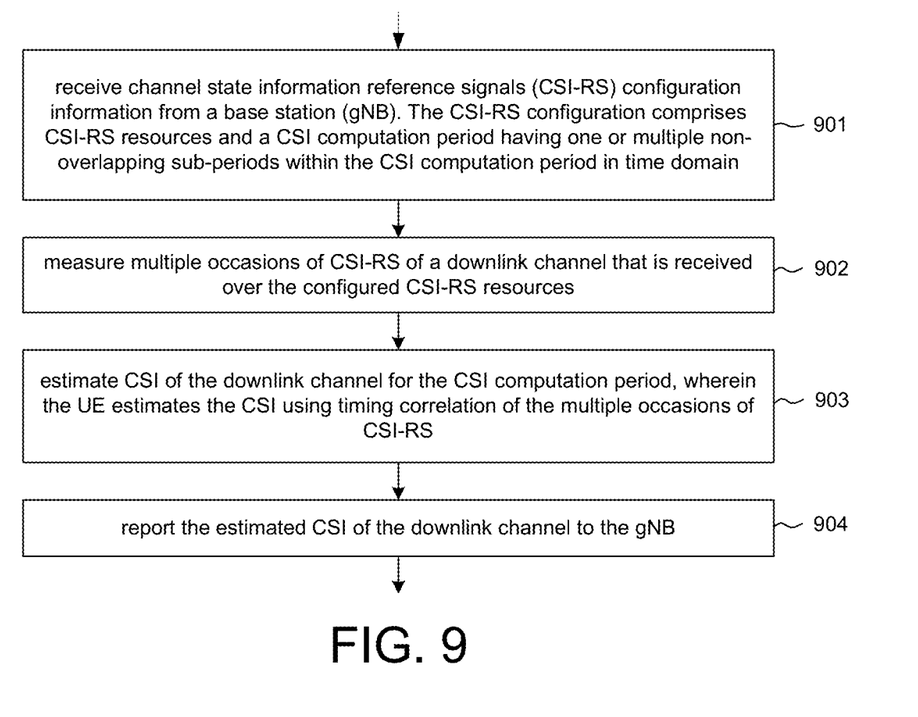
FIG. 9 is a flow chart of a method of configuring CSI computation period to support high velocity from UE perspective in accordance with one novel aspect.

FIG. 9 is a flow chart of a method of configuring CSI computation period to support high velocity in accordance with one novel aspect. In step 901, a UE receives channel state information reference signals (CSI-RS) configuration information from a base station (gNB). The CSI-RS configuration comprises CSI-RS resources and a CSI computation period having one or multiple non-overlapping sub-periods within the CSI computation period in time domain. In step 902, the UE measures multiple occasions of CSI-RS of a downlink channel that is received over the configured CSI-RS resources. In step 903, the UE estimates CSI of the downlink channel for the CSI computation period using timing correlation of the multiple occasions of CSI-RS. In step 904, the UE reports the estimated CSI of the downlink channel to the gNB, and the estimated CSI is reported based on the configured CSI computation period.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving channel state information reference signals (CSI-RS) configuration information from a base station (BS) by a user equipment (UE);
determining a first CSI reference slot for measurement and a second CSI reference slot for computation from the CSI-RS configuration information, wherein the second CSI reference slot occurs after the first CSI reference slot in time domain;
measuring CSI-RS of a downlink channel that is received before the first CSI reference slot for measurements; and
computing CSI of the downlink channel based on the second CSI reference slot for computation, wherein the UE estimates and predicts the CSI of the downlink channel at a time starting from the second CSI reference slot for computation.

2. The method of claim 1, wherein the UE is configured to report the CSI in a CSI reporting slot.

3. The method of claim 2, wherein the first CSI reference slot for measurements occurs at an offset before the CSI reporting slot.

4. The method of claim 2, wherein the second CSI reference slot for computation occurs at an offset after the CSI reporting slot.

5. The method of claim 1, wherein the UE reports the CSI of the downlink channel that comprises at least one of a rank indicator, a precoding matrix indicator, and a channel quality indicator, to the BS.

6. The method of claim 1, wherein the UE is configured with multiple occasions of CSI-RS before the first CSI reference slot for CSI measurements.

7. The method of claim 6, wherein the UE estimates and predicts the CSI of the downlink channel using timing correlation of the multiple occasions of CSI-RS.

8. The method of claim 1, wherein the UE is configured with a computation period for computing the CSI of the downlink channel during the computation period.

9. The method of claim 8, wherein the computation period further comprises multiple sub-periods within the computation period.

10. The method of claim 9, wherein the computed CSI comprises both sub-period-CSI and whole-period-CSI for the downlink channel.

11. A User Equipment (UE) comprising:
a receiver that receives channel state information reference signals (CSI-RS) configuration information from a base station (BS);
a control circuit that determines a first CSI reference slot for measurement and a second CSI reference slot for computation from the CSI-RS configuration information, wherein the second CSI reference slot occurs after the first CSI reference slot in time domain;
a measurement circuit that measures CSI-RS of a downlink channel that is received before the first CSI reference slot for measurements; and
a CSI handling circuit that computes CSI of the downlink channel based on the second CSI reference slot for computation, wherein the UE estimates and predicts the CSI of the downlink channel at a time starting from the second CSI reference slot for computation.

12. The UE of claim 11, wherein the UE is configured to report the CSI in a CSI reporting slot.

13. The UE of claim 12, wherein the first CSI reference slot for measurements occurs at an offset before the CSI reporting slot.

14. The UE of claim 12, wherein the second CSI reference slot for computation occurs at an offset after the CSI reporting slot.

15. The UE of claim 11, wherein the UE reports the CSI of the downlink channel that comprises at least one of a rank indicator, a precoding matrix indicator, and a channel quality indicator, to the BS.

16. The UE of claim 11, wherein the UE is configured with multiple occasions of CSI-RS before the first CSI reference slot for CSI measurements.

17. The UE of claim 16, wherein the UE estimates and predicts the CSI of the downlink channel using timing correlation of the multiple occasions of CSI-RS.

18. The UE of claim 11, wherein the UE is configured with a computation period for computing the CSI of the downlink channel during the computation period.

19. The UE of claim 18, wherein the computation period further comprises multiple sub-periods within the computation period.

20. The UE of claim 19, wherein the computed CSI comprises both sub-period-CSI and whole-period-CSI for the downlink channel.

* * * * *